United States Patent
Chou et al.

(10) Patent No.: US 10,066,141 B2
(45) Date of Patent: Sep. 4, 2018

(54) GRAPHENE SHEET COMBINING GRAPHITE FLAKE STRUCTURE AND ITS MANUFACTURING METHOD, AND SLURRY FOR MANUFACTURING THE SAME

(71) Applicant: Nitronix International Holdings Limited, Apia (WS)

(72) Inventors: Tung Chou, New Taipei (TW); Feng-Yu Wu, New Taipei (TW); Chih-Chieh Chan, New Taipei (TW); Wen-Hsien Liao, New Taipei (TW); Hsiu-Pin Chang, New Taipei (TW); Lain-Jong Li, New Taipei (TW); Jonathan Ross, New Taipei (TW)

(73) Assignee: Nitronix International Holdings Limited, Apia (WS)

( * ) Notice: Subject to any disclaimer, the term of this patent is extended or adjusted under 35 U.S.C. 154(b) by 0 days.

(21) Appl. No.: 15/255,477

(22) Filed: Sep. 2, 2016

(65) Prior Publication Data
US 2017/0058176 A1     Mar. 2, 2017

(30) Foreign Application Priority Data

Sep. 2, 2015   (TW) .............................. 104128974 A (51) Int. Cl.
| | | |
|---|---|---|
| *H01B 1/04* | (2006.01) | |
| *B82Y 30/00* | (2011.01) | |
| *C09K 5/14* | (2006.01) | |
| *C09D 1/00* | (2006.01) | |
| *H01B 1/24* | (2006.01) | |
| *C01B 32/19* | (2017.01) | |
| *C09D 7/61* | (2018.01) | |
| *C09D 7/40* | (2018.01) | |
| *C09D 7/80* | (2018.01) | |
| *C08K 3/04* | (2006.01) | |
| *B82Y 40/00* | (2011.01) | |

(52) U.S. Cl.
CPC ................ *C09K 5/14* (2013.01); *C01B 32/19* (2017.08); *C09D 1/00* (2013.01); *C09D 7/61* (2018.01); *C09D 7/70* (2018.01); *C09D 7/80* (2018.01); *H01B 1/04* (2013.01); *H01B 1/24* (2013.01); *B82Y 30/00* (2013.01); *B82Y 40/00* (2013.01); *C08K 3/042* (2017.05)

(58) Field of Classification Search
CPC ............. H01B 1/04; H01B 1/24; B82Y 30/00
USPC ........................................ 252/500, 502, 506
See application file for complete search history.

(56) References Cited

U.S. PATENT DOCUMENTS

| | | | | |
|---|---|---|---|---|
| 2012/0142832 A1* | 6/2012 | Varma | ...................... | C09D 5/24 524/145 |
| 2016/0107739 A1* | 4/2016 | Restuccia | ............. | B29C 70/885 428/114 |
| 2016/0376487 A1* | 12/2016 | Abramson | ............... | C08K 3/04 428/408 |

* cited by examiner

*Primary Examiner* — Tri V Nguyen
(74) *Attorney, Agent, or Firm* — Muncy, Geissler, Olds & Lowe, P.C.

(57) ABSTRACT

A graphene sheet combining graphite flake structure includes a graphite nanoplatelet material and a graphene material. The graphene material is mixed in the graphite nanoplatelet material, and the content of the graphene material is between 1% and 80% of the graphite nanoplatelet material. A slurry for manufacturing the graphene sheet combining graphite flake structure and a manufacturing method for the graphene sheet combining graphite flake structure are also disclosed.

5 Claims, 7 Drawing Sheets

GRAPHENE SHEET COMBINING GRAPHITE FLAKE STRUCTURE AND ITS MANUFACTURING METHOD, AND SLURRY FOR MANUFACTURING THE SAME

CROSS REFERENCE TO RELATED APPLICATIONS

This Non-provisional application claims priority under 35 U.S.C. § 119(a) on Patent Application No(s). 104128974 filed in Taiwan, Republic of China on Sep. 2, 2015, the entire contents of which are hereby incorporated by reference.

BACKGROUND OF THE INVENTION

Field of Invention

The present invention relates to a graphene sheet combining graphite flake structure and its manufacturing method, and a slurry for manufacturing the graphene sheet combining graphite flake structure.

Related Art

As the progress of technology, the electronic devices are designed and developed to the goals of thinner and higher performance. Under the demands of high speed calculation, the electronic components of the electronic device will generate more heat. However, the higher temperature may affect the properties of the electronic components. Moreover, it the operation temperature is too high, the electronic components may have permanent damages.

The conventional heat-dissipating device has a planar surface for attaching to the top of the heat source. If the heat-dissipating device is not flexible, it cannot fit the irregular shape of the heat source. That is, the heat-dissipating device may not attach to the surface of the heat source as large as possible, thereby reducing the heat dissipating performance.

Therefore, it is an important subject to provide a heat-dissipating structure with a flexible property and a better heat conducting effect.

SUMMARY OF THE INVENTION

An objective of the present invention is to provide a graphene sheet combining graphite flake structure and its manufacturing method, and a slurry for manufacturing the graphene sheet combining graphite flake structure. The graphene sheet combining graphite flake structure of the invention has a flexible property and a better heat conducting effect. Besides, the graphene sheet combining graphite flake structure of the invention further has an electromagnetic shielding effect. Moreover, since the graphene sheet combining graphite flake structure of the invention contains the graphene material, it will have high heat and electric conductivities, excellent flexibility, and stronger structure.

To achieve the above objective, the present invention discloses a graphene sheet combining graphite flake structure, which includes a graphite nanoplatelet material and a graphene material mixed in the graphite nanoplatelet material. The content of the graphene material is between 1% and 80% of the graphite nanoplatelet material.

To achieve the above objective, the present invention also discloses a manufacturing method of a graphene sheet combining graphite flake structure. The manufacturing method includes the following steps of: adding a graphite nanoplatelet material into a solvent and stirring to form a well-mixed solution, wherein a weight percentage of the graphite nanoplatelet material is between 0.1% and 10%; adding a graphene material in the solution and stirring to form a well-mixed slurry, wherein the content of the graphene material is between 1% and 80% of the graphite nanoplatelet material; applying the slurry on an object and drying the slurry to form a graphite coating; and pressing the graphite coating to form the graphene sheet combining graphite flake structure.

To achieve the above objective, the present invention further discloses a slurry for manufacturing a graphene sheet combining graphite flake structure. The slurry includes a solvent, a graphite nanoplatelet material and a graphene material. The graphite nanoplatelet material includes a plurality of graphite nanoplatelets. The graphene material is mixed with the graphite nanoplatelet material in the solvent. A weight percentage of the graphite nanoplatelet material is between 0.1% and 10%, and the content of the graphene material is between 1% and 80% of the graphite nanoplatelet material.

In one embodiment, the graphite nanoplatelet material includes a plurality of graphite nanoplatelets. The size of the graphite nanoplatelets is between 5 µm and 200 µm, and the thickness of the graphite nanoplatelets is between 0.1 µm and 0.5 µm.

In one embodiment, the graphene material includes a plurality of graphenes. The size of the graphenes is between 1 µm and 50 µm, and the thickness of the graphenes is between 0.002 µm and 0.02 µm.

In one embodiment, the thickness of the graphene sheet combining graphite flake structure is between 2 µm and 100 µm.

In one embodiment, the graphene sheet combining graphite flake structure is flexible.

In one embodiment, a thickness of the graphite coating is between 10 µm and 500 µm.

In one embodiment, the solvent is water, dimethylformamide (DMF), tetrahydrofuran (THF), ketones, alcohols, acetic acid acetate, or toluene.

In one embodiment, the ketones comprises N-methylpyrrolidone (NMP) or acetone, and the alcohols comprises ethanol or ethylene glycol.

In one embodiment, a weight percentage of the graphite nanoplatelet material is between 0.2% and 10%.

In one embodiment, the slurry is applied by a coating method or a printing method.

In one embodiment, the coating method comprises a spray coating or a spin coating, and the printing method comprises an inkjet printing or a screen printing.

In one embodiment, the applied slurry is dried at a temperature lower than 400° C. for 1 minute to 24 hours.

In one embodiment, the manufacturing method further includes a step of: departing the graphene sheet combining graphite flake structure from the object.

As mentioned above, the graphene sheet combining graphite flake structure contains a graphite nanoplatelet material and a graphene material mixed in the graphite nanoplatelet material. The content of the graphene material is between 1% and 80% of the graphite nanoplatelet material. In addition, the slurry of the invention contains a solvent, a graphite nanoplatelet material and a graphene material, and the graphite nanoplatelet material and the graphene material are mixed in the solvent. The weight percentage of the graphite nanoplatelet material is between 0.1% and 10%, and the content of the graphene material is between 1% and 80% of the graphite nanoplatelet material. Since the graphite nanoplatelet material and graphene material contained in the graphene sheet combining graphite flake structure and the slurry have good heat conductivity, the heat can be rapidly dissipated from the heat source. Accordingly, the graphene sheet combining graphite flake structure of the invention has better heat conducting effect. Besides, the graphene material allows the graphene sheet combining graphite flake structure to have a flexible property, so that the entire structure becomes stronger.

In addition, the graphene sheet combining graphite flake structure of the invention can fit the heat sources with different shapes, or it can be attached to a heat source with a large surface. This feature can satisfy the high heat-dissipation requirements of the electronic devices with different shapes. Moreover, the graphene sheet combining graphite flake structure of the invention further has an electromagnetic shielding effect.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
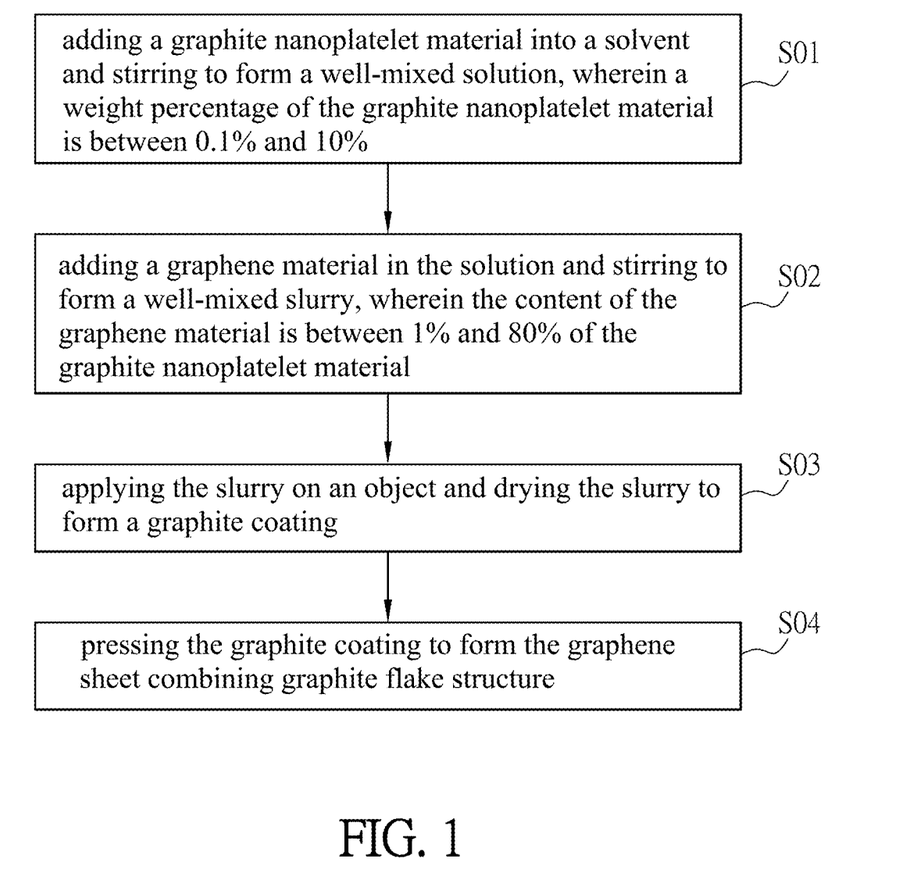
FIG. 1 is a flow chart of a manufacturing method of a graphene sheet combining graphite flake structure according to an embodiment of the invention.

FIG. 1 is a flow chart of a manufacturing method of a graphene sheet combining graphite flake structure 1 according to an embodiment of the invention, and FIGS. 2A to 2G are schematic diagrams showing the manufacturing procedures of the graphene sheet combining graphite flake structure 1 according to the embodiment of the invention.

As shown in FIG. 1, the manufacturing method of a graphene sheet combining graphite flake structure 1 includes the following steps of: adding a graphite nanoplatelet material into a solvent and stirring to form a well-mixed solution, wherein a weight percentage of the graphite nanoplatelet material is between 0.1% and 10% (step S01); adding a graphene material in the solution and stirring to form a well-mixed slurry, wherein the content of the graphene material is between 1% and 80% of the graphite nanoplatelet material (step S02); applying the slurry on an object and drying the slurry to form a graphite coating (step S03); and pressing the graphite coating to form the graphene sheet combining graphite flake structure (step S04). The detailed manufacturing procedures will be illustrated hereinafter with reference to FIGS. 2A to 2G.

Figure 2A:
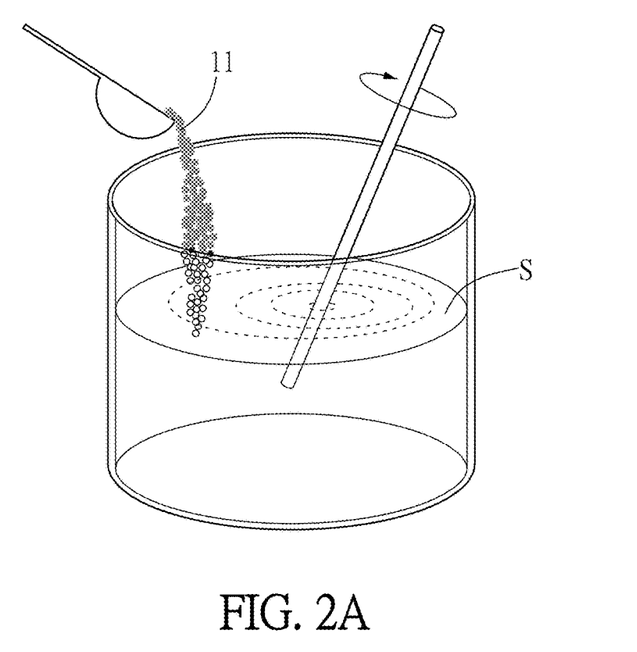
FIGS. 2A to 2G are schematic diagrams showing the manufacturing procedures of the graphene sheet combining graphite flake structure according to the embodiment of the invention.

As shown in FIG. 2A, the step S01 is to add a graphite nanoplatelet material 11 into a solvent S and to stir to form a well-mixed solution. The weight percentage of the graphite nanoplatelet material 11 is between 0.1% and 10%, and is, preferably, between 0.2% and 10%. In this embodiment, the graphite nanoplatelet material 11 is powder containing a plurality of graphite nanoplatelets. The size of the graphite nanoplatelets is between 5 μm and 200 μm, and the thickness of the graphite nanoplatelets is between 0.1 μm and 0.5 μm. The solvent S is, for example, water, dimethylformamide (DMF), tetrahydrofuran (THF), ketones, alcohols, acetic acid acetate, or toluene. In this embodiment, the solvent S is water. In some embodiments, the ketones includes N-methylpyrrolidone (NMP) or acetone, and the alcohols includes ethanol or ethylene glycol. In addition, the solvent S can be a mixture containing any of the above solvents or their combinations, and this invention is not limited. In some embodiments, the solvent S may also contain a resin adhesive such as, for example but not limited to, polyester, acrylic resin, aqueous phase acrylic resin, polyurethane, aqueous phase polyurethane, or polyvinylidene fluoride. This invention is not limited. Of course, the resin adhesive can be any polar and non-polar adhesive, and it is 5% of the solvent S or less.

Figure 2B:
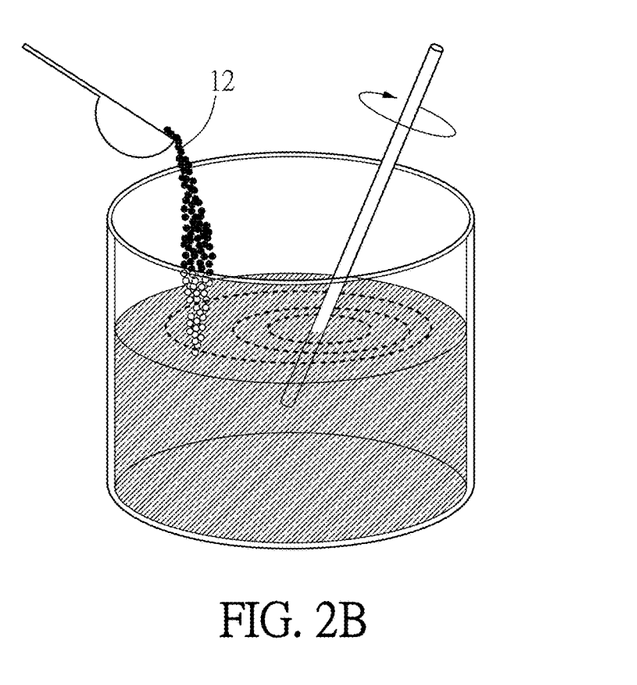

As shown in FIG. 2B, the step S02 is to add a graphene material 12 in the solution and to stir the solution to form a well-mixed slurry. Herein, the content of the graphene material 12 is between 1% and 80% of the graphite nanoplatelet material 11. In practice, the solution is stirred for 5 to 30 minutes so as to mix the graphite nanoplatelet material 11, the graphene material 12 and the solvent S to form a slurry. The graphene material 12 is basically composed of graphene, such as natural or artificial graphite compounds. The graphene material 12 includes a plurality of graphene particles. The size of the graphene particles is between 1 μm and 50 μm, and the thickness of the graphene particles is between 0.002 μm and 0.02 μm. In some embodiments, the graphene material 12 is added to the solvent S, and the solution is stirred. Then, the graphite nanoplatelet material 11 is added to the well-mixed solution, and the solution is stirred again. Alternatively, the graphite nanoplatelet material 11 and the graphene material 12 are added to the solvent S simultaneously, and the solution is stirred. This invention is not limited.

Accordingly, the slurry prepared by the steps S01 and S02 contains the solvent S, the graphite nanoplatelet material 11 and the graphene material 12, which are mixed to form a viscous slurry (like jelly). In this slurry, the weight percentage of the graphite nanoplatelet material 11 is between 0.1% and 10% and, preferably, is between 0.2% and 10%, and the content of the graphene material 12 is between 1% and 80% of the graphite nanoplatelet material 11.

Figure 2C:
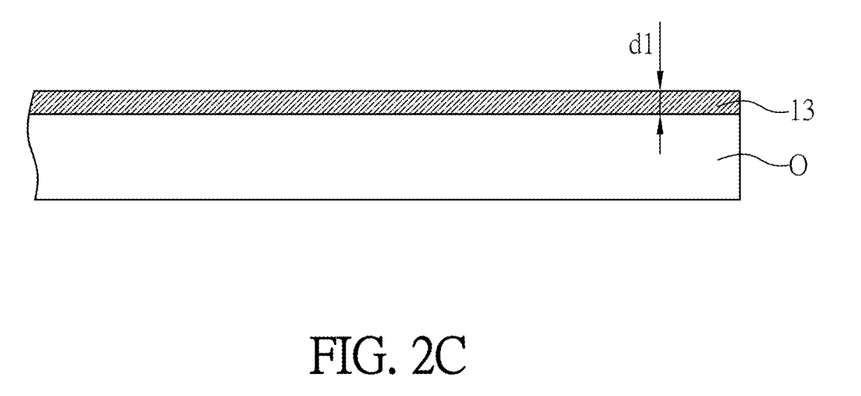
Figure 2D:
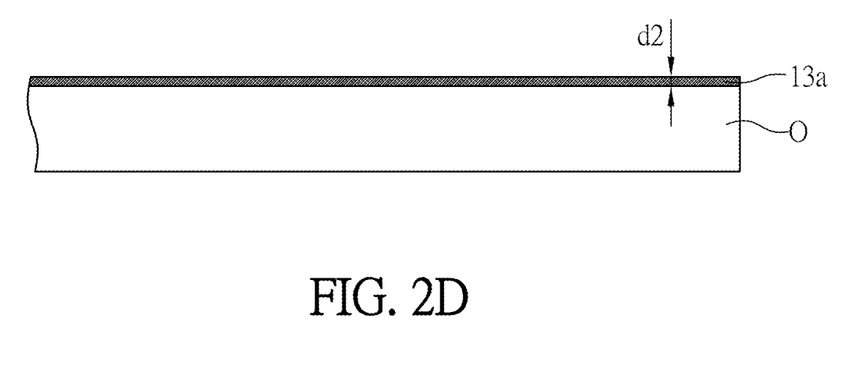

Referring to FIG. 2C, the step S03 is to apply the slurry on an object O and to dry the slurry to form a graphite coating 13. In this step, the object O is, for example but not limited to, a polymer, metal, ceramic, paper, or cloth substrate, and the slurry can be applied by a coating method or a printing method. In practice, the coating method includes a spray coating or a spin coating, and the printing method includes an inkjet printing or a screen printing. This invention is not limited. The thickness d1 of the graphite coating (the applied slurry by coating or printing) is between 10 μm and 500 μm. In addition, during the drying procedure, the object O applied with the slurry can be placed in an oven and baked to remove the solvent S (e.g. water) contained in the slurry S so as to form a graphite coating 13. To be noted, the drying temperature must be lower than 500° C. and higher than the room temperature for 1 minute to 24 hours. As shown in FIG. 2D, after the drying procedure, the thickness d2 of the dried graphite coating 13a is between 10 μm and 500 μm.

Figure 2E:
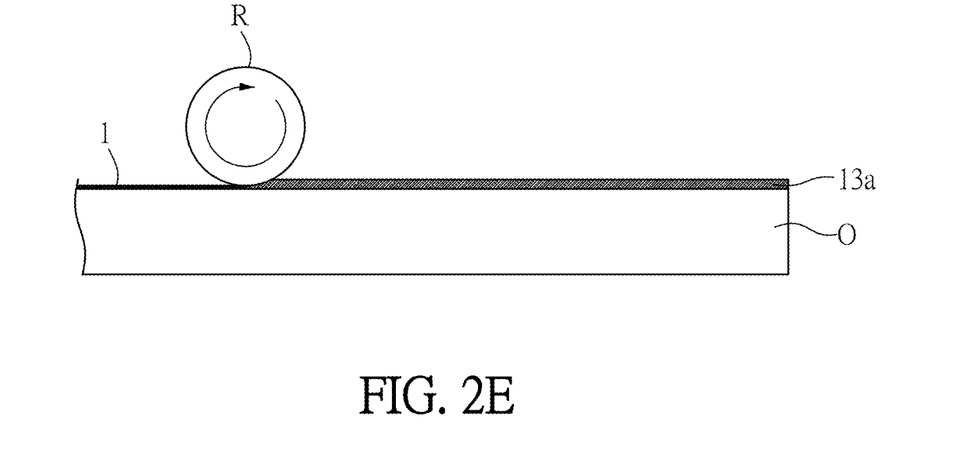

With reference to FIG. 2E, the step S04 is to press the graphite coating 13(13a) to form the graphene sheet combining graphite flake structure 1. In this embodiment, the graphite coating 13a is pressed by a roller R so as to obtain the desired graphene sheet combining graphite flake structure 1 on the object O.

Figure 2F:
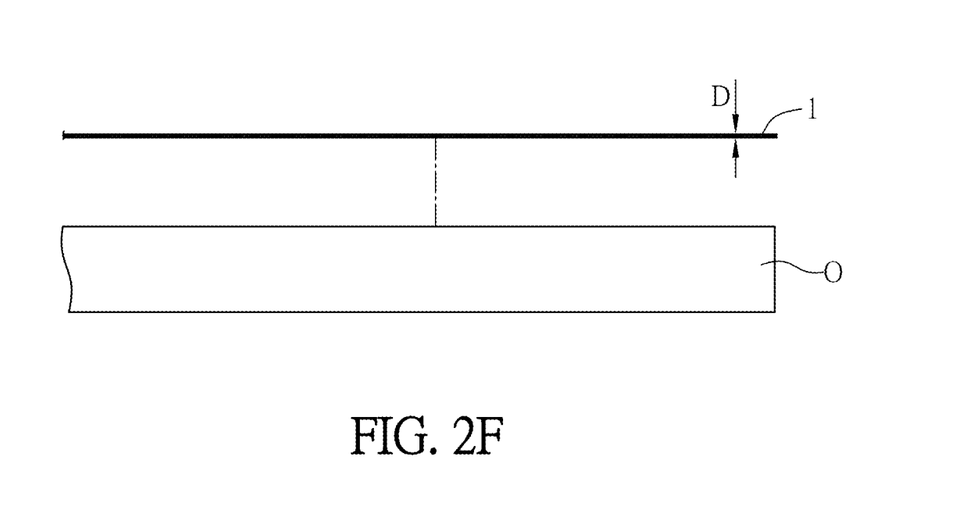
Figure 2G:
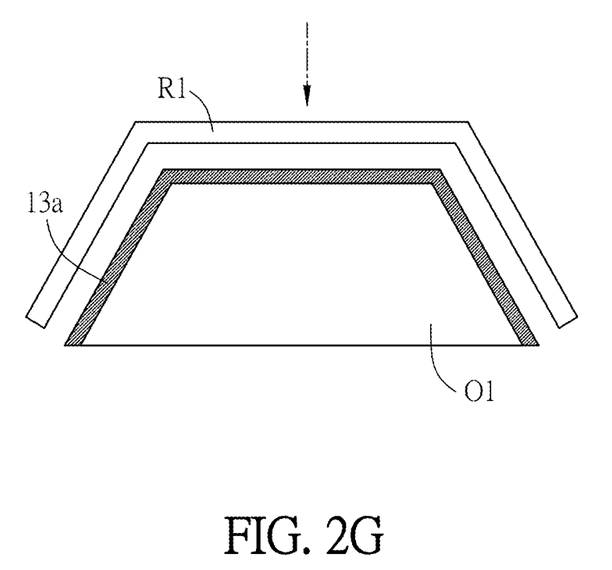

In different embodiments, the object O is not a planar object. For example, as shown in FIG. 2G, the object O1 has a trapezoid shape, and the slurry is applied on the outer surface of the trapezoid object O1 so as to form a graphite coating 13a. Afterwards, a pressing tool R1 with a shape fitting the surface of the trapezoid object O1 is used to press the dried graphite coating 13a, thereby obtaining a non-planar graphene sheet combining graphite flake structure. Accordingly, the slurry of the invention can form a graphene sheet combining graphite flake structure with the desired shape for fitting the heat source of different shapes or a larger surface. Thus, it can satisfy the high heat-dissipation requirement for the electronic device with different shapes.

Figure 3:
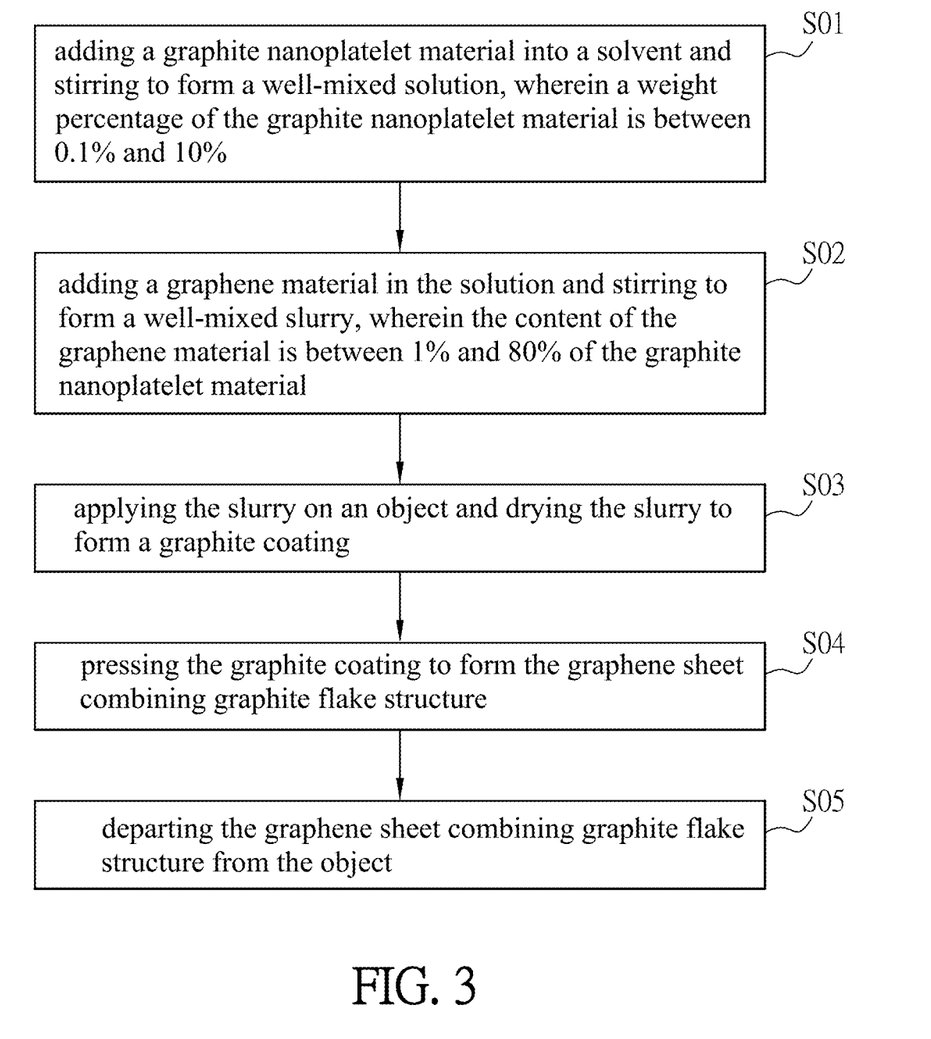
FIG. 3 is a flow chart of another manufacturing method of a graphene sheet combining graphite flake structure according to the embodiment of the invention.

FIG. 3 is a flow chart of another manufacturing method of the graphene sheet combining graphite flake structure 1 according to the embodiment of the invention.

Different the manufacturing method of FIG. 1, the manufacturing method of FIG. 3 further includes a step S05, which is to depart the graphene sheet combining graphite flake structure 1 from the object O. As shown in FIG. 2F, a knife tool is inserted between the graphene sheet combining graphite flake structure 1 and the object O, thereby breaking the vacuum status between the graphene sheet combining graphite flake structure 1 and the object O to depart the graphene sheet combining graphite flake structure 1 from the object O. Accordingly, the graphene sheet combining graphite flake structure 1 is obtained. The thickness D of the obtained graphene sheet combining graphite flake structure 1 is between 2 µm and 100 µm.

To be noted, in some embodiments, the graphene sheet combining graphite flake structure 1 and the object O together can be attached to the heat source directly, and this invention is not limited.

In this embodiment, the graphene sheet combining graphite flake structure 1 is flexible and includes the graphite nanoplatelet material 11 and the graphene material 12. The graphene material 12 is mixed in the graphite nanoplatelet material 11, and the content of the graphene material 12 is between 1% and 80% of the graphite nanoplatelet material 11. The graphite nanoplatelet material 11 includes a plurality of graphite nanoplatelets. The size of the graphite nanoplatelets is between 5 µm and 200 µm, and the thickness of the graphite nanoplatelets is between 0.1 µm and 0.5 µm. In addition, the graphene material 12 includes a plurality of graphenes. The size of the graphenes is between 1 µm and 50 µm, and the thickness of the graphenes is between 0.002 µm and 0.02 µm. The thickness D of the graphene sheet combining graphite flake structure 1 is between 2 µm and 100 µm.

As mentioned above, the graphite nanoplatelet material and graphene material contained in the graphene sheet combining graphite flake structure 1 have good heat conductivity, so that the heat can be rapidly dissipated from the heat source. Besides, the thickness D of the graphene sheet combining graphite flake structure 11 is between 2 µm and 100 µm, so that the graphene sheet combining graphite flake structure 1 can be used as a heat-dissipation structure with better heat conductivity and thinner thickness. These features are suitable for the light and thin requirement of the current electronic products. The conventional graphite platelet made of only the graphite nanoplatelet has a heat conductive coefficient of about 200 W/m-K. However, the heat conductive coefficient of the graphene sheet combining graphite flake structure 1 containing 10% of the graphene material 12 (graphene) is about 400 W/m-K. Therefore, when the graphene sheet combining graphite flake structure 1 is applied to dissipate the heat of an electronic component (e.g. CPU), the heat can be rapidly dissipated. Moreover, it is possible to cooperate with a heat dissipating device, which includes a heat sink and a fan, for removing the heat transmitted from the electronic component to the graphene sheet combining graphite flake structure 1, thereby decreasing the temperature of the electronic component. In addition, the graphene sheet combining graphite flake structure 1 of the present invention can be applied to the heat source with different shapes or a larger surface. Besides, the graphene material 12 makes the graphene sheet combining graphite flake structure 1 have high heat and electricity conductivities and better flexibility. Thus, the entire structure intensity of the graphene sheet combining graphite flake structure 1 is stronger. Furthermore, the graphene sheet combining graphite flake structure 1 also has an electromagnetic shielding property. In one embodiment, when the thickness of the graphene sheet combining graphite flake structure 1 is 10 µm, it can provide an electromagnetic shielding effect of 37 dB~45 dB.

Figure 4:
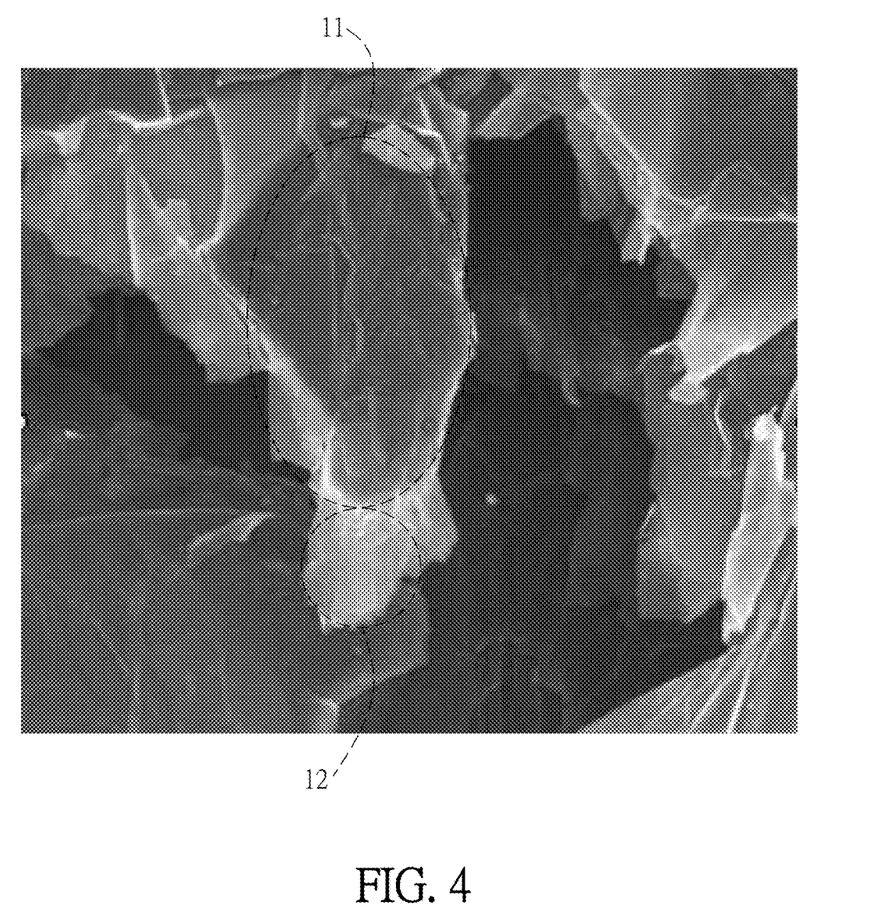
FIG. 4 is a schematic diagram showing the graphene sheet combining graphite flake structure according to the embodiment of the invention viewing from an SEM.

FIG. 4 is a schematic diagram showing the graphene sheet combining graphite flake structure according to the embodiment of the invention viewing from an SEM (Scanning Electron Microscopy). Herein, the graphene sheet combining graphite flake structure is cut into a plurality of small pieces, and then the edges of the small pieces are observed by SEM so as to obtain the image as shown in FIG. 4.

The graphene sheet combining graphite flake structure of FIG. 4 has a thickness of 30 µm. Besides, the content of the graphene material 12 is about 5% of the content of the graphite nanoplatelet material 11. As shown in FIG. 4, the graphite nanoplatelet material 11 (graphite nanoplatelets) is the thicker plate part, and the graphene material 12 (graphene) is the semi-transparent feathery part.

In summary, the graphene sheet combining graphite flake structure contains a graphite nanoplatelet material and a graphene material mixed in the graphite nanoplatelet material. The content of the graphene material is between 1% and 80% of the graphite nanoplatelet material. In addition, the slurry of the invention contains a solvent, a graphite nanoplatelet material and a graphene material, and the graphite nanoplatelet material and the graphene material are mixed in the solvent. The weight percentage of the graphite nanoplatelet material is between 0.1% and 10%, and the content of the graphene material is between 1% and 80% of the graphite nanoplatelet material. Since the graphite nanoplatelet material and graphene material contained in the graphene sheet combining graphite flake structure and the slurry have good heat conductivity, the heat can be rapidly dissipated from the heat source. Accordingly, the graphene sheet combining graphite flake structure of the invention has better heat conducting effect. Besides, the graphene material allows the graphene sheet combining graphite flake structure to have a flexible property, so that the entire structure becomes stronger.

In addition, the graphene sheet combining graphite flake structure of the invention can fit the heat sources with different shapes, or it can be attached to a heat source with a large surface. This feature can satisfy the high heat-dissipation requirements of the electronic devices with different shapes. Moreover, the graphene sheet combining graphite flake structure of the invention further has an electromagnetic shielding effect.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A graphene sheet combining graphite flake structure, consisting of:
   a graphite nanoplatelet material; and
   a graphene material mixed in the graphite nanoplatelet material, wherein the content of the graphene material is between 1% and 80% of the graphite nanoplatelet material.

2. The graphene sheet combining graphite flake structure of claim 1, wherein the graphite nanoplatelet material comprises a plurality of graphite nanoplatelets, a size of the graphite nanoplatelets is between 5 μm and 200 μm, and a thickness of the graphite nanoplatelets is between 0.1 μm and 0.5 μm.

3. The graphene sheet combining graphite flake structure of claim 1, wherein the graphene material comprises a plurality of graphenes, a size of the graphenes is between 1 μm and 50 μm, and a thickness of the graphenes is between 0.002 μm and 0.02 μm.

4. The graphene sheet combining graphite flake structure of claim 1, wherein a thickness of the graphene sheet combining graphite flake structure is between 2 μm and 100 μm.

5. The graphene sheet combining graphite flake structure of claim 1, wherein the graphene sheet combining graphite flake structure is flexible.

* * * * *